United States Patent
Sibgatulin et al.

(10) Patent No.: US 10,520,615 B1
(45) Date of Patent: Dec. 31, 2019

(54) FLUID RESONANT SEISMIC SURVEYING

(71) Applicants: Viktor Sibgatulin, Krasnoyarsk (RU);
Vadim Kukharev, Moscow (RU);
Vladimir Tolkachev, Moscow (RU);
Viktor Bondarenko, Moscow (RU);
Igor Miletenko, Moscow (RU);
Dmitrii Borisov, Dolgoprudny (RU)

(72) Inventors: Viktor Sibgatulin, Krasnoyarsk (RU);
Vadim Kukharev, Moscow (RU);
Vladimir Tolkachev, Moscow (RU);
Viktor Bondarenko, Moscow (RU);
Igor Miletenko, Moscow (RU);
Dmitrii Borisov, Dolgoprudny (RU)

(73) Assignee: International Seismic Data Processing Corporation, Dover County of Kent, DE (US)

( * ) Notice: Subject to any disclaimer, the term of this patent is extended or adjusted under 35 U.S.C. 154(b) by 0 days.

(21) Appl. No.: 16/134,223

(22) Filed: Sep. 18, 2018

(51) Int. Cl.
*G01V 1/02* (2006.01)
*G01V 1/18* (2006.01)
*G01V 1/30* (2006.01)
*G01V 1/24* (2006.01)

(52) U.S. Cl.
CPC ............... *G01V 1/02* (2013.01); *G01V 1/181* (2013.01); *G01V 1/247* (2013.01); *G01V 1/307* (2013.01); *G01V 2210/1232* (2013.01)

(58) Field of Classification Search
CPC .......... G01V 1/02; G01V 1/181; G01V 1/247; G01V 1/307; G01V 2210/1232
See application file for complete search history.

(56) References Cited

U.S. PATENT DOCUMENTS

| | | | | | |
|---|---|---|---|---|---|
| 4,121,464 | A | * | 10/1978 | Geiger | G01V 7/00 181/0.5 |
| 4,244,223 | A | * | 1/1981 | Geiger | G01V 7/00 73/170.16 |
| 5,040,414 | A | * | 8/1991 | Graebner | E21B 47/00 73/152.59 |
| 5,112,126 | A | * | 5/1992 | Graebner | E21B 47/02232 33/283 |
| 5,159,833 | A | * | 11/1992 | Graebner | E21B 47/00 73/152.39 |
| 7,376,507 | B1 | * | 5/2008 | Daily | G01C 21/00 340/988 |

(Continued)

*Primary Examiner* — Isam A Alsomiri
*Assistant Examiner* — Amie M Ndure
(74) *Attorney, Agent, or Firm* — Nadya Reingand; Yan Hankin

(57) ABSTRACT

Methods, systems, and devices for the location of oil and gas deposits are disclosed. The technology is based on the recording of natural (i.e. not man-made) oscillations of oil and gas environments under the influence of the energy of resonances of the gravitational tides. The recording is performed by low-frequency geophones (0.1-10 Hz). The resonances are recorded, graphed, and analyzed. The time of the onset of the resonances of 14-day gravitational tides is pre-calculated by adding the tidal waves from the Moon, the Sun, and the stress wave arising in the Earth's lithosphere in connection with the periodic oscillation of the position of the barycenter of the Earth-Moon system. The calculation of the time of the onset allows for the prediction of optimal times for surveying according to the method of the present invention.

20 Claims, 3 Drawing Sheets

(56) References Cited

U.S. PATENT DOCUMENTS

2008/0288173 A1* 11/2008 Saenger .................. G01V 1/30
702/16
2010/0161231 A1* 6/2010 Atila ...................... G01V 9/002
702/15

* cited by examiner

FLUID RESONANT SEISMIC SURVEYING

FIELD OF THE INVENTION

This invention relates to the measuring and determining of the location of oil and gas deposits.

BACKGROUND OF THE INVENTION

It is known that the oil and gas deposits (OGD) in the Earth's crust, due to their higher compressibility in comparison with the its surroundings within the ground, generate their own oscillations (i.e., the "Anchar" effect) under the influence of both man-made and natural factors.

Newton, on the basis of the law of universal gravitation, $$F = G\frac{m_1 m_2}{r^2}, G = 6.67 \times 10^{-11},$$

explained the nature of tides in the seas and oceans. Gravitational tides extend past the visible marine environment into the Earth's crust. Modern high-precision gravimeters and GPS-receivers allow for the registration and study of the effect of tidal waves on oil and gas deposits within a geological environment. The effect of tidal waves results in vertical fluctuations of rock and rock particles. These fluctuations cause changes in the properties of the stress-strain state (SSS) of the geological environment, and the SSS can be monitored.

In middle latitudes of the globe, the Earth's surface and layers within the Earth's crust are displaced along the Earth's radius by 30-40 cm, twice daily.

Tides have a complex structure, but the most studied tides tend to be along the equator (parallels). These tides form a traveling wave not only in the oceans, but also in the geological environment. The tides along the meridians of the globe are standing waves. Tides may be divided into daily, semi-diurnal, semi-monthly—i.e. 14-15 days—and longer, and are associated mainly with the movement of the Earth around the Sun.

The center of gravity between the Earth and the Moon, i.e., the barycenter of the Earth-Moon system, is in fact however the center point of the Earth's rotation about the Sun. In this connection, due to the difference in mass (the Moon's mass is 81 times smaller than the Earth's mass), the barycenter is located inside the Earth and fluctuates between a depth between 1,200 km and 1,900 km from the Earth's surface during the lunar month. It is known that if the center of gravity of the physical system does not coincide with the geometric center, then during the rotation periodic stresses (i.e., deformations) appear in the body of the system. Thus, in addition to the gravitational (tidal) influence of the Moon and the Sun, the Earth's lithosphere is constantly subjected to compressive-stretching waves by the changing position of the barycenter.

During the lunisolar month, the Earth-Moon distance changes by approximately 40,000 km, the phases of the Moon vary from the full moon to the absence of the Moon, and the barycenter of the Earth-Moon system oscillates approximately 700 km inside the lithosphere—the upper mantle. In order to relate the above-mentioned gravitating factors to a single frame of reference, the normalization of parameters of gravitating factors in the interval from zero to one (0, 1) is proposed.

The intersections of the graphs of the time-dependent parameters of the gravitating factors normalized to the unit (Earth-Moon distance, moon phase, distance of the barycenter from the Earth's surface and from the observer, since the barycenter at any point fluctuates not only vertically, but also "along the parallels) correspond to the time (with an accuracy of ±12 hours) of the resonances of the gravitational tides.

At the same time, the maximum impact on the SSS caused by the barycenter fluctuations is in the interval of ±28-30° relative to the ecliptic plane.

The validity of the above provisions is confirmed by experimental data including the resonances of gravitational tides, seismic emission, electromagnetic emission, and radon emission in groundwater.

In prior art technology, the seismic noise of oil and gas deposits is recorded without reference to the source of that seismic noise. ANCHAR technology does not use an energy source and is based on artificial sources of impact which dramatically increase the cost of such "passive" seismic technologies. The main drawback of "passive" seismic technology is the insufficient signal-to-interference ratio for a reliable deposit detection (P>0.8-0.9). At the same time, the energy from current surface non-explosive sources is not sufficient to excite the natural vibrations of the deposits being searched for at greater depths. The energy of the resonances of gravitational tides—as utilized by the present invention—significantly greater than the energy injected by prior art sources into the geological environment. Direct measurements confirm this statement.

It is possible to try to impact oil and gas deposits by weak influences of tuning of the SWIP-signal (Slip-Sweep technology signal) in the source to the resonant frequency of the deposit. As a result, the ratio of the signal to the intrinsic oscillations of the deposit against a background of interferences does not provide for a reliable mapping of reservoir boundaries.

SUMMARY OF THE INVENTION

The invention comprises methods, systems, and devices for the registration of natural oscillations of fluid oil and gas environments under the influence of gravitational tide resonances in the Earth's crust for the purpose of predicting locations of fluid and oil deposits. The invention comprises a Fluid Resonance Seismic Survey (FRSS) technology for directly forecasting locations of oil and gas deposits.

The technology is based on the recording of natural (i.e. not man-made) oscillations of oil and gas environments under the influence of the energy of resonances of the gravitational tides. The recording is performed by low-frequency geophones (0.1-10 Hz). The registration of an oil or gas deposit's own noise (i.e. vibration) is based on "passive" seismic technologies such as "Anchar". In such "passive" seismic technologies, the energy source of the noise of the oil or gas is unknown and is not taken into account when analyzing low-frequency noise records.

The FRSS technology of the present invention is based on recording the energy (i.e. power) of 14-day resonances of gravitational tides as they affect deposits within a geological formation. Tides enter into resonances based on the gravitational force from the Earth. Such resonances are then recorded, graphed, and analyzed. The time of the onset of the resonances of 14-day gravitational tides is calculated by adding the tidal waves from the Moon, the Sun, and the stress wave arising in the Earth's lithosphere in connection with the periodic oscillation of the position of the barycentre of the Earth-Moon system. The calculation of the time of the onset allows for the prediction of optimal times for surveying according to the method of the present invention.

DETAILED DESCRIPTION OF THE PREFERRED EMBODIMENT

Definitions

Figure 1:
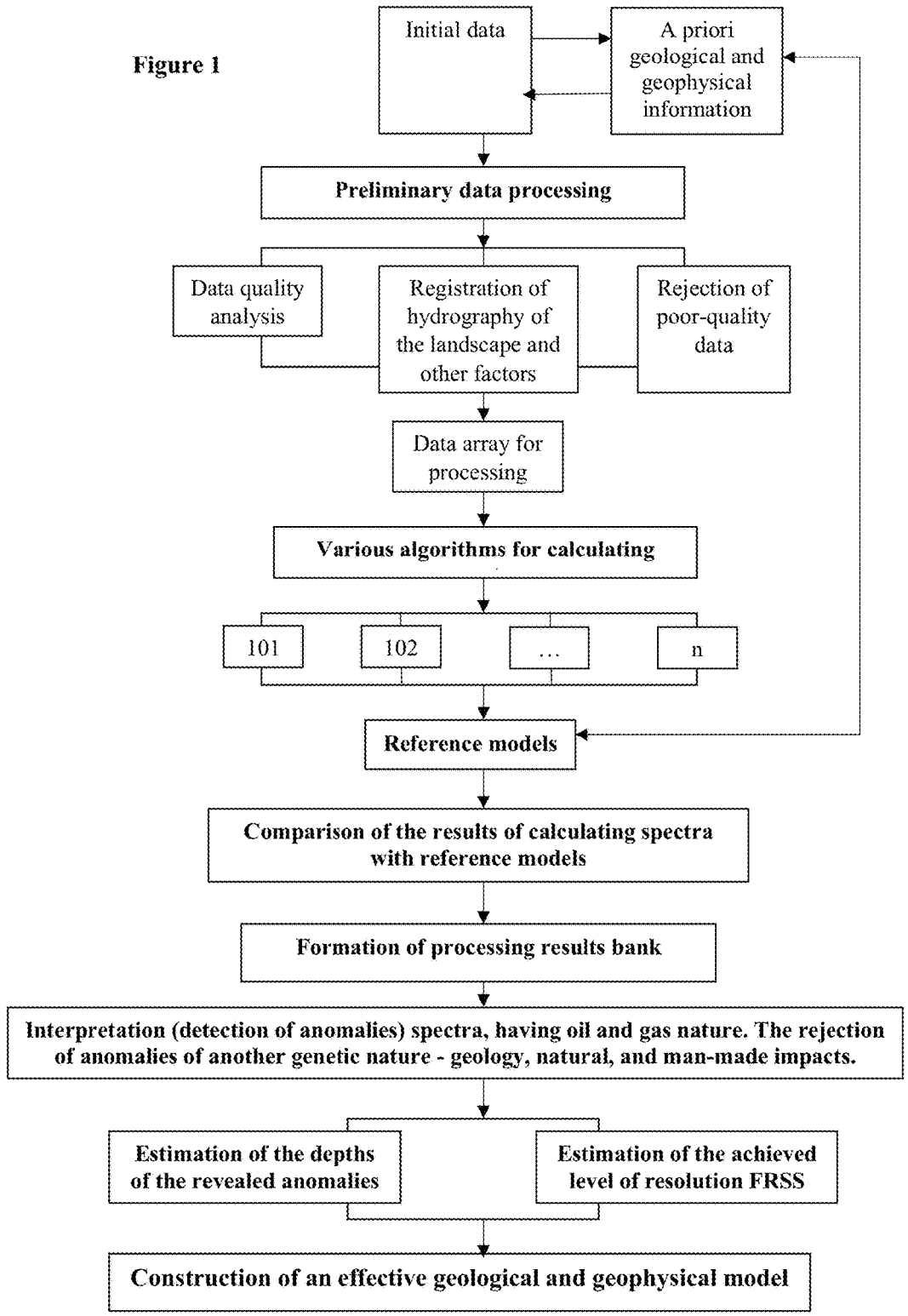
FIG. 1 is a flowchart illustrating the analysis/calculation steps of the method of the present invention.

FRSS. "Fluid Resonant Seismic Survey technology," "FRSS technology," or "FRSS," as used herein, is defined as the registration and recording of tidal influences on oil and gas deposits below the Earth's surface.

The invention comprises methods, systems, and devices for the registration of natural oscillations of fluid oil and gas environments under the influence of gravitational tide resonances in the Earth's crust for the purpose of predicting locations of fluid and oil deposits. The invention comprises a Fluid Resonance Seismic Survey (FRSS) technology for directly forecasting locations of oil and gas deposits.

The technology is based on the recording of natural (i.e. not man-made) oscillations of oil and gas environments under the influence of the energy of resonances of the gravitational tides. The recording is performed by low-frequency geophones (0.1-10 Hz). The registration of an oil or gas deposit's own noise (i.e. vibration) is based on "passive" seismic technologies such as "Anchar". In such "passive" seismic technologies, the energy source of the noise of the oil or gas is unknown and is not taken into account when analyzing low-frequency noise records.

The FRSS technology of the present invention is based on recording the energy (i.e. power) of 14-day resonances of gravitational tides as they affect deposits within a geological formation. Tides enter into resonances based on the gravitational force from the Earth. Such resonances are then recorded, graphed, and analyzed. The time of the onset of the resonances of 14-day gravitational tides is calculated by adding the tidal waves from the Moon, the Sun, and the stress wave arising in the Earth's lithosphere in connection with the periodic oscillation of the position of the barycentre of the Earth-Moon system. The calculation of the time of the onset allows for the prediction of optimal times for surveying according to the method of the present invention.

It is known that long-period (14-15 day) tidal waves are capable of entering states of resonance. For the aquatic environment and, the emergence of the resonance of diurnal and semidiurnal tides—the estimated thickness (i.e. depth) of the aquatic environment should be more than 20 km, which rarely exists on Earth. As for longer-period tides (e.g., 14-15 days), the conditions for resonance are simpler—a body of water of more than 30-100 meters. This estimate makes it possible to explain the behavior of oil and gas deposits under the influence of such resonances caused by gravitational tides. As a result of the resonances in a fluid-closed environment, standing waves arise in the frequency range between fractions of Hertz to several Hertz (i.e., 0.1-5.0 Hz). The variation depends on the parameters of the oil or gas deposit (e.g., reservoir capacity, size, fluid saturation). By registering, from the Earth's surface, such low-frequency oscillations of the oil and gas deposits, and analyzing the registered information, the location of the deposits can be better established.

The conditions for the appearance of deformation waves under the influence of the resonance of gravitational tides in the Earth's crust have yet to be sufficiently investigated in the prior art.

The depth of the penetration of deformation waves caused by gravitational resonances is likely not less than 30 km, which covers the lithosphere.

Resonances of gravitational tides enhance the natural oscillations (0.1-5.0 Hz) of oil and gas deposits, which makes it possible to use them as an analyzable energy source for direct searches of oil and gas. On this principle, the technology of the present invention (FRSS) has been developed.

Experiments have been conducted to assess the effect of gravitational tidal resonances on oil and gas deposits. FRSS has been successfully used to forecast the locations of oil and gas deposits in the basin of the Podkamennaya Tunguska River (Krasnoyarsk Territory). The results of the experiments have confirmed the effectiveness of the FRSS technology in the complex geological and geophysical conditions of Eastern Siberia.

It has been experimentally established that the stresses occurring in fluid oil and gas environments under the influence of gravitational tidal resonances reach 1-2% of the value of the rock pressure. Thus, at a rock pressure of about 100 atm, additional stresses appear in oil and gas reservoirs equivalent to a pressure increase of 1-2 atmospheres.

The energy of the tidal resonances causes distinguishable and distinct oscillations in the form of standing waves to appear in the reservoir. A standing wave in a fluid-saturated reservoir occurs about one day before the time of the onset of the gravitational tide resonance. The same standing wave reaches its maximum at the moment of gravitational tide resonance and the standing wave then deteriorates in one to two days, depending on the parameters of the reservoir (e.g., power, linear dimensions, fluid saturation). This standing wave is recordable and further analyzed by the technology of the present invention.

Based on field experiments, the following information has been determined:

1. The technology of the FRSS of the present invention provides for forecasting of fluid-saturated reservoirs with a location accuracy of 5-10 meters (or less) at depths up to 4,000-6,000 meters.

2. Maximums along the spectrum of intrinsic oscillations are as follows:

(a) for gas deposits, lower frequencies from 0.3 to 1.5-2.0 Hz;

(b) for oil deposits, from 1.5-2.0 Hz to 4.0-5.0 Hz;

(c) for water-saturated reservoirs, from 4.0-5.0 to 10 Hz; and (d) for rock, from 10 Hz and higher.

The difference in the magnitude of the maximum of the spectra of the intrinsic oscillations for different media can be explained due to different degrees of compressibility of the contents of the deposit. For reservoirs of gas media, the compressibility coefficient can reach 10-1000 units, for oil and gas media (depending on the gas factor), the compressibility coefficient can fluctuate up to two or three units. Water is much less compressible, so water-saturated reservoirs have oscillations/resonances at higher frequencies. The maximum of the frequency spectrum exceeds about 5.0 Hz or more. The natural distribution of the spectra of the natural oscillations of fluid media (oil, gas, water) allows for direct prediction of the fluid type, provided that fluid saturation data of the area is available.

The FRSS technology of the present invention is based on a sufficiently stable source of influence—tidal resonances into the Earth's surface. Such resonances of gravitational tides cause standing waves in oil and gas deposits. The standing waves allow for the low-frequency component (from 0.1 to 5.0 Hz) to be stably recorded in the spectrum against a background of strong noise without the need for use of artificial sources of excitation.

Resonances of tides affect the stress-strain state (SSS) of the geological environment and increase the emission of hydrocarbon gases (methane, propane), which further increases the reliability of the direct forecast of the deposit.

The resonance time is pre-calculated. For example, the time of predicted resonances may be calculated by using programs for calculation of ephemerides, DE405/LE405, of the Jet Propulsion Laboratory (JPL, Caltech, USA). Along with the known types of tidal effects (i.e., the position of the Sun, Moon, and Earth), the effect of barycenter oscillations is also taken into account. Low-frequency oscillations of the deposits at resonances of the gravitational tides may last up to three to four days. During a lunar month (28-29 days), at least two strong resonances are typically recorded. This makes it possible to limit the registration of seismic noise and other geochemistry to a time period of about 3 days for the search of such deposits. Following data processing via spectral analysis, the results are compared against forecasted values to determine the nature of spectral anomalies.

The FRSS technology of the present invention utilizes the energy of the resonances of gravitational tides and deformation waves caused by oscillations of the barycenter of the Earth-Moon system ("the barycenter"). The barycenter's influence on gravitational tides is a critical factor to be included in the analysis for purposes of accurately locating oil and gas deposits. This method is also a natural and non-explosive manner of studying the energy impact on fluid oil and gas systems in order to predict the systems' locations. This stable and steady energy impact creates standing waves which generate deformation waves, which are recorded by low-frequency (0.1-10 Hz) geophones on the surface (above potential reservoirs).

An experiment was conducted to estimate the magnitude of deformations occurring in a geological environment under the influence of gravitational tides. The pressure increase based on the effect of gravitational tide resonances fluctuates between 1% and 2% of the value of the rock pressure at a target level. Accordingly, the pressure increase based on the resonance of the tides is between 1 atm and 2 atm, given a rock pressure of 100 atm. This is significantly greater than a pressure increase based on prior art methods.

According to the present invention, seismic noise is recorded for 3-4 days, of which about 1 day is labeled as "resonant." The recording obtains fixed values of the deposit's own oscillations a day before a resonance, on the day of the resonance, and one day after the resonance. The time of resonance of gravitational tides is preliminarily calculated. The method for calculating the time of resonances and for independent control of resonances in various geophysical fields comprises utilizing the natural pulsed electromagnetic field of the Earth, the hydrogeo-deformation field of the Earth (HGD monitoring), seismic emission, gas hydrogeochemistry (radon, helium), and other measurements.

The resonance time may be preliminarily calculated via ephemeride-based calculations, which makes it possible to rearrange the recording seismic equipment to preset observation points on the "nonresonant" days (from 2 to 4 days between resonances). The optimal set of equipment for a one-time arrangement (registration of a specific resonance) is 100 low-frequency geophones (0.1-10 Hz) and digital recorders of a seismic series (such as CME-4311VND).

The resonance conditions for waves of novel processes close in frequency and duration are generally known. Calculating the stresses in rock under the resonance effect is challenging because the environment parameters should be known. Hence, the technology of fluid-resonance seismic exploration provides for an experimental appraisal of stresses in rock under resonance conditions. To this end, recorders of the natural impulse electromagnetic field of the Earth are used. They are installed in datum points for the overall field work period (2-3 per area being explored). In order to monitor resonances and normalize the power of the seismic spectrum from different types of resonances, the model of the present invention includes the setting of 2-3 reference points in the working area, wherein the recording is conducted continuously throughout the period of the field work at such control points. Conventional grids of the prior art, on the other hand, which comprise about 500 devices, are moved to new points after the registration of a resonance.

The present invention is applicable in various mining and geological and climatic conditions—from the tundra to the mountain taiga in both the summer and winter. It is characterized by technological simplicity: low-frequency geophone receivers comprised of velosimeters (0.1-10 Hz) are installed on the area under study for a period of 3 days with a density corresponding to the detail of the problem being solved (for example, one instrument per square kilometer). In addition, equipment is installed to register the Earth's natural pulse electromagnetic fields and hydrocarbon gases.

The cost related to the present invention is 10 times lower than the cost of a traditional complex for geophysical oil and gas deposit prospecting. The technology does not exclude the use of traditional seismic exploration tools in combination, and it allows to optimize the search for oil and gas. Both poorly studied regions and known oil and gas fields may be studied.

Methods of data processing and interpretation of low-frequency (0.3-5 Hz) anomalies of seismic noise spectra from oil and gas deposits.

The main elements of any seismic technology for studying the geological environment is to map the boundaries of objects, determine their position in space based on the registration of reflected, refracted, and other types of waves, and to identify various heterogeneities in the sections (e.g., faults, lithologic change zones, deposits, etc.)

The present invention lacks the main disadvantage of "passive seismic" technology—the optimal signal-to-noise ratio in seismic noise is achieved by using the energy of resonance of gravitational tides (due to the fact that a known energy source affects the deposits with an excess of 1-2 times the rock pressure). With a mountain pressure at depths of up to 3,000 meters and 100 atmospheric pressure, the increase in pressure in the deposits during the resonance of gravitational tides increases by 1-2%, thereby achieving an optimal signal-to-interference ratio ($\geq 2.0$) and eliminating the need for applying artificial energy to the geological environment.

Prior art technology, without the use of independent information, does not provide more accuracy than ±250-300 meters. It is possible to improve the accuracy of the geological cross-section, but this requires the combining (calibration) of geophysical technologies data to the wells, which is not always possible.

The present invention is commensurate with the resolution of standard CDP (common depth point) because the present technology does not use waves of the seismic (sound) range (km/s), and instead the strain waves are 3 orders of magnitude lower (1-5 m/sec). In this case, the wavelength of deformation waves in the geological environment (L 4-5 m) is an order of magnitude lower than the standard seismic survey of CDP. As a result, the resolving power of the present invention from positions of wave theory is not inferior to the resolution of seismic prospecting at frequencies of 50-100 Hz (at a wave propagation velocity of 3-5 km/s), which allows mapping low-power (1-2 m) layers saturated with mobile oil and gas fluid provided that the volume of the oil and gas trap is significant, i.e., the linear dimensions of the trap are not less than 500 meters (the condition on the basis of their required minimum volume for the "stock" of energy entering the trap).

It should be noted that it has been experimentally established that in the presence of water-bearing objects on the surface and in the upper part of the section, the deposits may be affected by any natural technogenic impacts (transport, strong wind, industrial explosions, etc.) surface standing waves of Faraday, in the range of 0.3-5 Hz, which are not associated with the deposits at depth. Therefore, when processing initial data, analysis and rejection of "false" low-frequency anomalies not of oil and gas nature is necessary.

Thus, despite the technological simplicity of registering data with the method of the present invention, at the stage of processing and interpretation, it is necessary to justify and apply the following techniques:

1. Culling the anomalies of spectra that are not of an oil and/or gas nature;
2. Utilizing a priori geological and geophysical information for estimating the depths of occurrence of the predicted deposits. At the same time, each deposit is considered as an active antenna, re-radiating standing Faraday waves into the surrounding geological space; and
3. Linking the identified anomalies of the spectra of seismic signals to deposits at different depths (with a multi-layer deposit).

Figure 3:
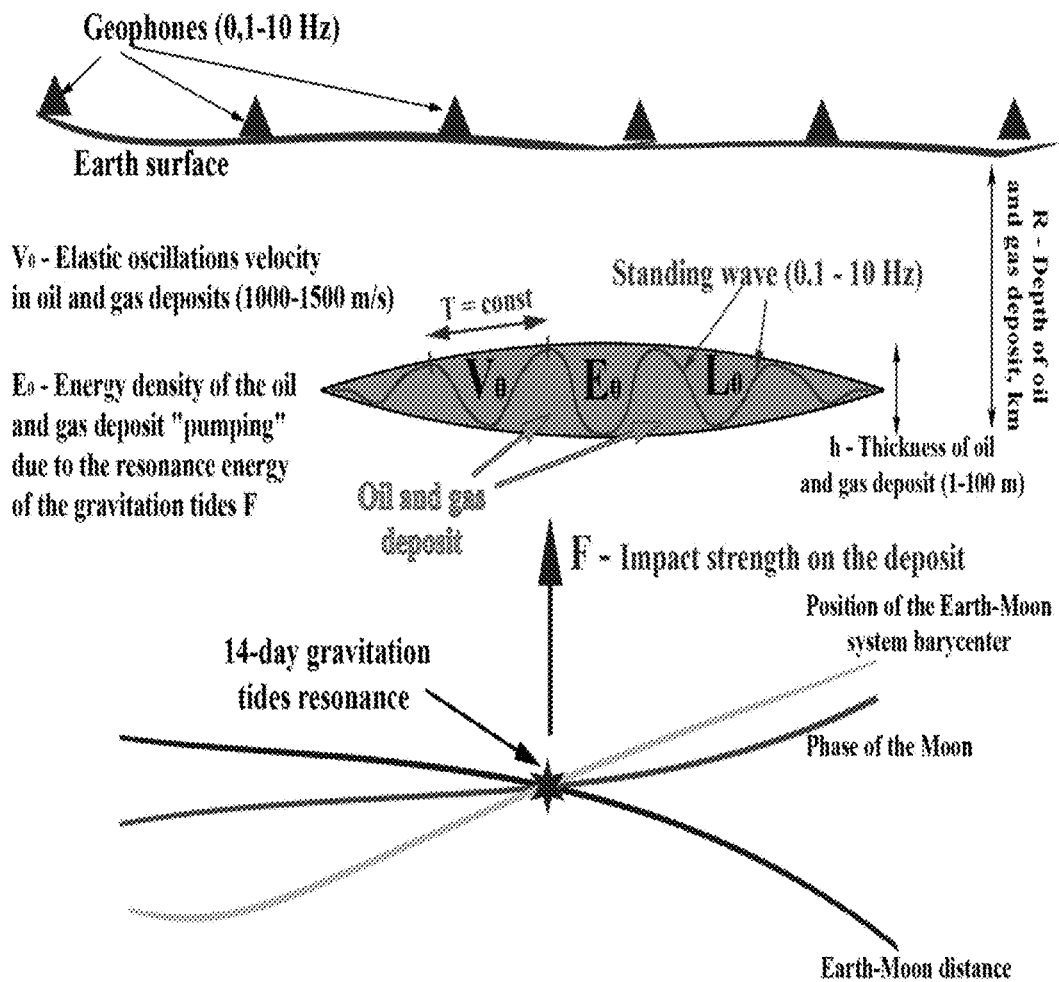
FIG. 3 is an illustration of the system of an oil and gas deposit which the present invention records and analyzes to create geological and geophysical models with predictions of locations of oil and gas deposits below the Earth's surface.

FIG. 3 illustrates the system which creates an impact force on the deposit (value "L"). This value is calculated by measuring the effect of three gravitational forces on a geological formation (with or without potential oil or gas deposits within them). Those three forces resonance-causing forces and are sourced from (1) gravitational tides caused by the Moon, (2) gravitational tides caused by the Sun, and (3) gravitational tides caused by the barycentre of the Earth-Moon system.

Each of the resonant forces described above are combined to create the impact force value, L. The impact force effect on the geological deposit below the surface forms a standing wave resonance within the geological deposit (valued between 0.1 and 5 Hz) at different periods of time. These standing waves tend to occur on certain days and arise due to the oil or gas deposit being saturated with compressible fluid and less compressible water. Furthermore, the deposits are located inside a practically incompressible rock framework and must react to external physical effects resulting in specific seismic noise (i.e. the standing waves). Thus, the effect of the impact force value on the geological formation is what forms a final value, wherein that final value is recorded by the seismic receivers of the present invention. On said certain days, the final value ("T") remains constant, which indicates the standing waves. Based on the value (in Hz) of the standing waves, and the spectral analysis of the standing waves, the methodology is able to predict the location and depth of the oil and/or gas deposit. The location of the oil and gas deposit coincides with the spatial position of low-frequency spectral anomalies in seismic signals (standing waves). The depth of anticipated oil and gas reserves is evaluated using commonly known mathematical techniques employing the theory of phased array antennas.

The resulting values of resonances of 14-15-day tides are recorded, the recordings reflecting standing waves in a range of frequencies (0.1 to 5 Hz). The standing wave frequency depends on the parameters of the deposit such as its capacity, it dimensions, and fluid saturation within the deposit. Surface seismic receivers register these low frequency oscillations of the deposits, and from the registration and resulting data, the location of the deposit can be established.

The energy values generated by the gravitational tidal resonances are estimated at the Samotlor Field reference area. It is established that the increase in pressure in the occurrence of standing waves in an oil reservoir with a thickness of 10 m as a result of the resonance from gravitational tides is from 1% to 2% of the value of the total rock pressure. Thus, with a rock pressure of about 100 atm, the increase in pressure in the reservoir due to the energy of the resonance of tides fluctuates in the range from 1 to 2 atmospheres.

The resonance duration of low-frequency (14-15 day) gravitational tides is at least 12 hours. From this, it follows that the excess pressure ($\Delta P$) arising at the boundary of the reservoir-enclosing rocks is:

$$\Delta P = \frac{1 \div 5 \text{ atm}}{m^2}$$

The above relationship is several orders of magnitude higher than the pressure at the rock boundaries when the front of the seismic wave generated by a surface source (explosion) passes through a standard seismic survey.

It is also known that the energy of a source is scattered in space according to the law:

$$F = \frac{1}{R^3}$$

In the above relationship, "R" is the distance to the source. At the same time, if the source has a volume of 1 m³ at the time of a given impact, and if the pressure is up to 1,000 atm, then at a distance of 10 meters, the pressure (due to geometric divergence and an increase in volume) does not exceed 1 atm. In the depth range of 1-3 km, the pressure at the wave front will be:

$$P_{1000} \approx \frac{1000 \text{ atm}}{10^9 m^3} \approx 10^{-6} \text{ atm}$$

Thus, at depths of about 3,000 m, the $\Delta P$ will be about $10^{-7}$ atm.

Hence, there is a very low efficiency of recording the resonances of oil and gas deposits at depths of 3,000 meters or more based on energy from artificial sources which may generate standing waves. Despite this, other methods for passive seismic surveys continue to use artificial sources of excitation.

In contrast to other methods, the present invention employs/presumes gravitational tidal resonances as the natural (i.e. non-artificial) and non-explosive source as the cause of the generation of standing waves in oil and gas deposits.

The accuracy of the resonance time is ±6 hours. The duration of low-frequency resonances of gravitational tides (tides in the Earth's crust and changes in the SSS (stress-strain state) of the geological environment due to fluctuations of the barycenter of the Earth-Moon system of 700 km during the Lunar month) is not less than 12 hours. This amount has been experimentally confirmed—the duration of the anomalies of the seismic noise spectra of the deposits caused by resonances of the gravitational tides is about 12 hours.

To register such low-frequency (0.1-10 Hz) oscillations of standing waves in the deposits, it is necessary to use seismological equipment, for example:

Broadband seismometers—Velocimeters CME-4311VND.

Specifications of the CME-4311VND:

Configuration: Three orthogonal sensitivity axes—Vertical, North, East;

Sensitivity: 2000 (4000) V/(m/s) or as per customer specification;

The maximum input signal is: 5 mm/s;

Bandwidth standard (Extended): 0.0167 (60 s)—50 Hz 0.033 (30 s)—50 Hz;

Dynamic range at 1 Hz: 121 dB;

Integral noise in the band: 0.0167 (60 sec)—50 Hz (35.6 nm/sec (142.4 µV);

Parasitic center-to-center sensitivity: −60 dB;

Nonlinearity at 1 Hz: 0.5%;

Temperature range: Standard version: −12 degrees C. to +55 degrees C.;

Temperature range: Low temperature version: −40 degrees C. to +55 degrees C.;

Rated voltage supply: 9 to 36 V (nominally 12V) unipolar from a non-isolated source Nominal consumption *: 27 mA—standard design, 8 mA—low power (9.5 to 16 V);

Time to start receiving data after turning on: 10-30 minutes

Arresting, centering of mass: Not required;

Self-calibration: Not available;

Type of connector, cable Connector: PC-10TV, 10 pins 1.5 m UTP Cat.5 or customer specification;

Weight: 5.3 kg;

Dimensions including handle diameter×height: 180×194 mm;

Body configuration: Bubble level, handle, three legs, two indexes.

This model combines low noise, high sensitivity, compact size and light weight. A high sensitivity value makes it easier to observe weak signals even without using special low-noise precision data acquisition systems. A convenient small case in combination with low weight makes it easy to carry the device, especially in conditions comprising low transport availability.

Like other molecular electronic devices, CME-4311VND seismometers are extremely reliable instruments. They do not require any special means or special techniques for transportation and installation. To get started, one simply needs to install the device on a flat horizontal surface, plug in the power, and wait a few minutes. The seismometer can be used in various measurement areas, including stationary seismic stations and field experiments.

The sensor element of the molecular-electronic converter comprises two sealed areas comprising electrolytes connected together by a channel with electrodes. The electrodes are separated by a perforated dielectric insulator. Electrolytes play the role of a sensitive mass, and the hydrodynamic resistance of the sensitive element bridges the entire system, which stabilizes its transfer function.

Velocimeters with a digital recorder, Guralp, having parameters similar to CME-4311VND, are manufactured in Europe and may also be utilized with FRSS technology.

It should be noted that the types of geophones and recorders can vary, but they must comply with the basic requirements of stable registration of standing waves in the deposits in a significant range of depths (from 1 to 5-7 km) and operation in a wide range (from −40 to +50° C.), and also to be simple in operation, transportable, and having high sensitivity for recording weak signals (velocimeters).

In order to analyze the information registered (in the form of natural reservoir oscillation spectra) and to compare the results to data from before and after resonance, the seismic noise recording of the present invention is conducted for at least 3 days (at each observation point). This is one of the fundamental differences between the technology of the present invention and prior art technologies, where the time of recording seismic noise does not exceed 1 hour. Furthermore, the time of arrival of the 14-day resonances from gravitational tide forces is preliminarily calculated prior to the seismic recordings being rendered.

Elements of the FRSS Technology.

Based on the conditions for the formation and registration of standing waves in monitored geological formations, the FRSS technology comprises the following elements:

1. A forecast of the time of the onset of a resonance of gravitational tides for each specific territory (or each geological formation).

2. The installation of an array of seismological recording means for recording seismic noise for three days within the predetermined set of days, which provides for continuous registration of seismic noise spectra in the range of 0.1-10 Hz during the day of the resonance, the day before resonance, and a day after the resonance.

3. To ensure proper registration, the 3-component seismic receivers, CME-4311 (or other receivers), are oriented in space and set horizontally to a previously cleaned and prepared area. For swampy terrain, and to prevent from moisture and rain, the recording equipment is placed in protective watertight casings.

4. The recording equipment (seismic receivers and recorders) is rearranged at "inter-resonant" intervals of time (during periods of time when gravitational tide resonances are not predicted to occur). To install and rearrange the registration points, all types of available transport are used, depending on the specific conditions. The technology for rearrangement should take into account the following:

The amount of time comprising an absence of predicted resonances of 14-day gravitational tides.

Features of the present season and features of relief and orohydrography (swamps, forests, etc.).

5. Topography (i.e. coordinates) is provided via GPS signals, as well as preliminary topographic maps having a scale of 1:25,000. The accuracy of the topography is ±5-10 meters. The height of observation points is removed from large-scale maps (1:25,000-1:10,000).

6. Processing of primary records. Primary records are evaluated for availability of useful information, absence of hardware, and any technical errors. Calculation of the spectra of seismic records is performed using standard spectral analysis procedures, which are available, for example, in MatLab programs.

7. Periods of recordation. Given that the duration of the resonance of gravitational tides is not less than 6 hours, it is preferable to analyze the spectra of seismic records at least every 6 hours.

8. Three component recording. Three-component recording of seismic noise allows, after processing and interpretation of data, for the identification of the direction of an area of reservoirs comprising increased fracturing and thus filled with mobile oil and gas fluid. For the actual visual data, well-known techniques for constructing spatial diagrams of seismic noise spectra may be used.

9. Normalization of the spectra of seismic noise. During constant monitoring of resonances of gravitational tides, the following setup is preferred:

3-4 (and up to 6) seismic noise reference points for recording the standing wave of the geological formation, 3-4 reference points for recording the emission levels of hydrocarbon gases (methane, propane), and 3-4 reference points for registration of the level of the electromagnetic field of the Earth, which may be sensitive to the change in the stress-strain state of the geological environment under an influence of resonances of gravitational tides. Because the energy value of different types of tidal resonances does not remain constant, and varies with time, the recordings of the seismic noise reference points are processed by normalizing the spectra of seismic noise for ordinary observation points versus reference points. The monitoring network in the FRSS technology may be determined by customers and specific conditions (e.g., the sizes of the formations under study). As a rule, the density of the registration network is sufficient for one reference point every 1 km. When an anomaly of low-frequency seismic noise spectra (i.e. standing waves) is specified, it is advisable to increase the density to one reference point every 500 meters.

10. Criteria for the detection of anomalies in the spectra of seismic noise—the ratio of the amplitude of the seismic noise spectrum on a resonant day ($A_P$) and the amplitude of the spectrum on a non-resonant, or resonance-free, day ($A_O$) can be related as:

$K = A_P/A_O \geq 2.0.$

11. Estimation of the "oil and gas" nature of anomalies found in the spectra of seismic signals. The spectra of natural oscillations of the geological formation occurs in the interval of 0.1-10 Hz. For a purely gas deposit, the spectra will be shifted towards lower frequencies (in comparison with the oil reservoir). Proceeding from the well-known nature of standing waves in a gaseous medium, the frequency of a standing wave is a priori lower than the frequency of a standing wave in a liquid petroleum medium.

12. Checking the nature of low-frequency anomalies. For an independent verification of the oil and gas nature of low-frequency anomalies found during the process, it is further recommended to use aero-geochemical monitoring for hydrocarbon gases of methane and propane. Monitoring may be performed on a "resonant" and "non-resonant" day. If there is a deposit in the geological environment, on the "resonant" day, anomalies of methane/propane emissions will be recorded that coincide geographically with the low-frequency anomalies of the seismic noise spectra. The technique and technology of aero-geochemical surveying is standard and is regulated by the corresponding instructions on aero-geochemistry. Taking into account the technology of the present invention, however, it is only necessary to conduct repeated (monitoring) surveys on the "non-resonance" and "resonant" days.

The analysis of the initial data from the standing wave recordation is shown in FIG. 1. FIG. 1 shows that a priori geological and geophysical information is combined with the initial data from the standing waves. The data is preliminarily processed. The preliminary processing comprises data quality analysis, registration of hydrography of the landscape and other factors, and rejection of poor quality data. A data bank is created for storing the preliminarily processed data. The combined data is input into various algorithms for calculating and thus forming reference models, which are recycled into the a priori information which combines with initial data. Thus, with every iteration of the process over time, the system becomes more accurate.

The reference models are then compared to results from calculated/theoretical spectra, and a processing results bank is created, which stores the results of the comparison between actual and theoretical. Within the processing results bank, the results may further be combined for interpretation via the detection of anomalies within the spectra, as well as the rejection of particular anomalies having a nature other than gravitational tides (e.g., geologic movements, natural effects, man-made impacts). The depths of the revealed anomalies are then estimated. The achieved level of resolution is also estimated. Then, the two estimated values are combined to construct a geological and geophysical model.

Figure 2:
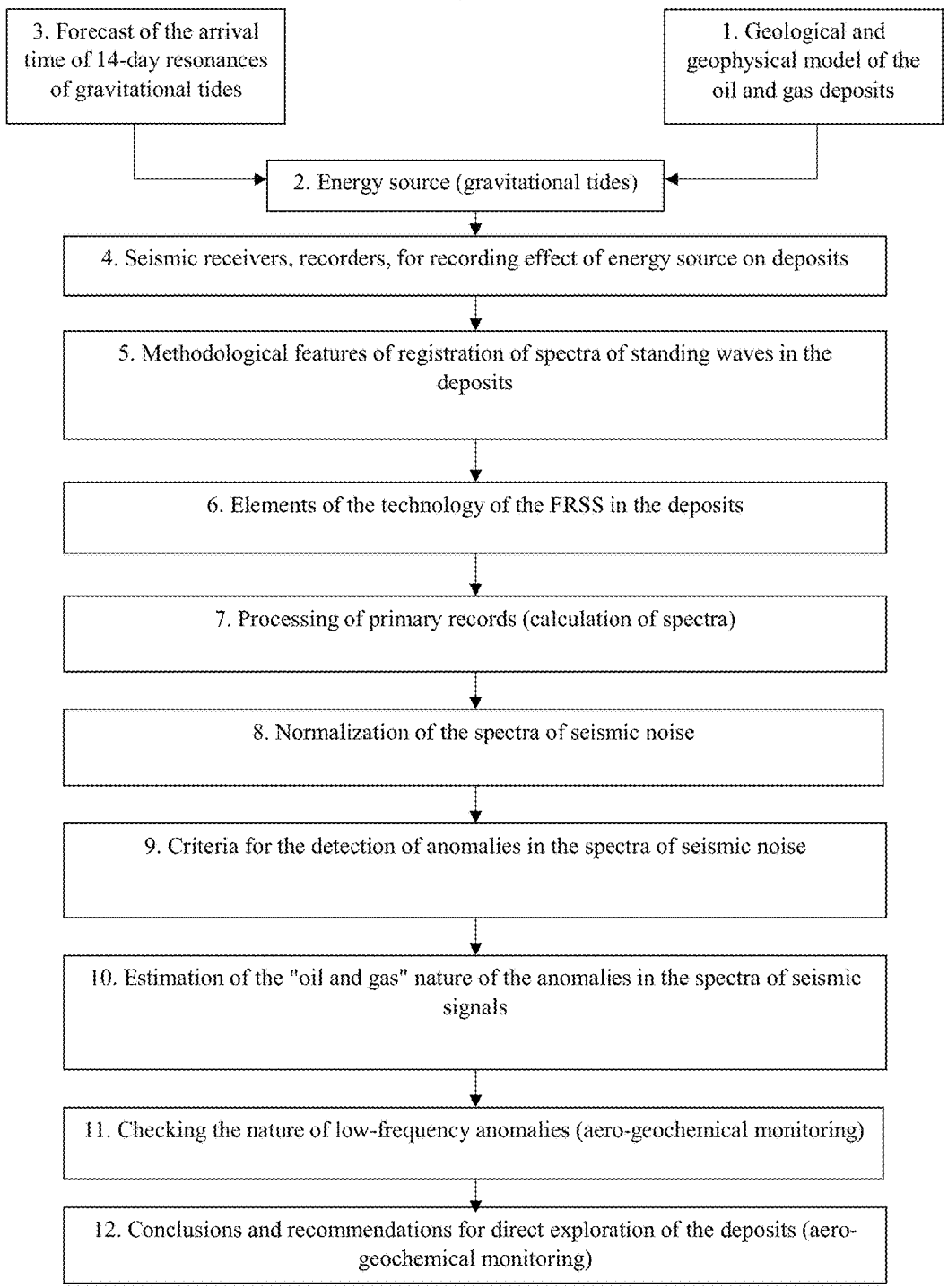
FIG. 2 is a flowchart illustrating the data collection steps of the method of the present invention.

Turning now to FIG. 2, the structural scheme of the invention is illustrated via a flow chart. To initiate a process of analyzing a geological formation or environment, two pieces of preliminary information are combined: the forecast of the arrival time of a 14-day resonance from gravitational tides and any preliminary geological/geophysical model of the geological environment. The forecast of the arrival time of the resonance is based on an energy source, which, based on the present invention, is gravitational tides which are influenced by the Sun and the Moon relative to the Earth's water surfaces. Seismic receivers and recorders make up the recording units which are positioned according to a desired density and uniformly along a geological area of interest. The receivers and recorders measure frequencies of standing waves within the geological environment and spectra of standing waves are produced.

Elements of the technology in the deposit. Primary records of the spectra are preliminarily processed and then normalized. Based on the geological environment, certain criteria are formed for the detection of anomalies in the spectra. From the anomaly criteria, the "oil and/or gas" nature of the spectra is calculated. Furthermore, each anomaly is checked against other potential causes for seismic noise (e.g., changes in porosity, fracturing, permeability of oil-gas-saturated objects). Finally, a conclusion and recommendations may be provided for direct exploration of the geological formation for oil and gas deposits.

The following example method is provided to further exemplify the present invention's ability to evaluate the possibility of linking the low-frequency anomalies of spectral FRSS data to a geological area:

1. The oil and/or gas deposits are assumed to comprise an active (i.e. radiating) acoustic system (as shown in FIG. 3).

2. The energy density in the oil and gas deposit is represented as Equation 1:

$$\rho_0 = \frac{E_0}{4\pi \times L_0^2}, \qquad (i)$$

where $L_0$ represents the waves of natural vibration of the oil and gas deposit caused by the gravitational tides.

3. The energy density on the Earth's surface is represented as Equation 2:

$$\rho_i = \frac{E_i}{R_i^2}, \quad \text{(ii)}$$

where $R_i$ represents the occurrence depth.

4. Provided the geological environment has a good gain bandwidth (slight absorption of low frequencies from 0.5 Hz to 5.0 Hz), Equations 1 and 2 are equated to produce Equation 3:

$$\rho_0 \approx \rho_i, \text{ or } \frac{E_0}{4\pi \times L_0^2} = \frac{E_i}{R_i^2}. \quad \text{(iii)}$$

5. Solving Equation 3 for the occurrence depth ($R_i$), Equation 4 is obtained:

$$R_i = 3.5 \times L_0 \times \sqrt{\frac{E_i}{E_0}}, \quad \text{(iv)}$$

where $$\eta = \frac{E_i}{E_0}$$

is referred to as the directivity factor of the oil and gas deposit (i.e., the acoustic antenna).

6. Therefore, with a known value for $L_0$, which is obtained from the seismic recorders, $R_i$ can be calculated. For example, provided that $\eta=1.0$, and $L_0\approx1500$ meters (v=1.0 Hertz, V=1500 m/s), $R_i$=5.2 km. In another example, provided that $\eta=0.5$, and $L_0\approx300$ meters (v=5.0 Hertz, V=1500 meters/second), $R_i$=3.7 km.

In order to estimate the oil and gas deposit occurrence depth ($R_i$), the fluid resonance seismic exploration (FRSS) technology must be calibrated with a deposit with known parameters (occurrence depth, reservoir thickness and its extent, tide resonance energy, an estimate of the absorption of waves of various frequencies in the geological environment between the oil and gas deposit and the surface).

The algorithm enables evaluating the occurrence depth of a fluid body (oil and gas deposit, water) with an accuracy of up to ±500 meters for depths down to 3,000 meters.

To further increase the accuracy of determining the occurrence depth of an oil and gas deposit at least by a factor of two, techniques of analyzing spectra not from single recording stations but from spatial observation systems employing J. Capon's algorithm may be used [Capon J., High resolution frequency-wave number spectrum analysis, Proc. of the IEEE, vol. 57, pp. 1408-1418, August 1969.].

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for locating oil and gas deposits below the Earth's surface, comprising:
    predicting a period of low-frequency oscillations at resonances of 14-day gravitational tides, said period being 3-4 days, said gravitational tides comprising a result of a formulaic combination of all three of: a distance between the Earth and the Moon, a phase of the Moon, and a position of a barycenter of the Earth-Moon system, said predicting comprising:
        forecasting an arrival time of a 14-day resonance from gravitational tides via a first array of seismic recorders positioned uniformly according to a desired density along a geological area of interest, said first array of seismic recorders measuring frequencies of standing waves within the geological area of interest, and
        producing a spectra of standing waves based on said measured frequencies of standing waves within the geological area of interest,
    positioning a second array of seismological recorders along the geological area of interest during the predicted period of the low-frequency oscillations at resonances of said 14-day gravitational tides,
    registering low-frequency oscillations of the oil and gas deposits and additional seismic noise via said second array of seismological recorders,
    performing a spectral analysis of the registered low-frequency oscillations to locate anomalies in seismic signals via said second array of seismic recorders, and
    determining a depth of the oil and gas deposits via employment of a theory of phased array antennas based on said located anomalies, said theory comprising solving for depth based on a relationship between the low-frequency oscillations recorded and analyzed and the energy density of the oil/gas deposit.

2. The method of claim 1, wherein said located anomalies comprise resonances in the range of 0.1 to 10.0 Hz.

3. The method of claim 1, wherein either of the arrays of seismological recorders comprises low frequency geophones and seismic digital recorders.

4. The method of claim 1, wherein either of the arrays of seismological recorders comprises CME-4311VND seismometers.

5. The method of claim 1, wherein either of the arrays of seismological recorders comprises velocimeters.

6. The method of claim 1, wherein the additional seismic noise is continuously registered for a period of at least 3 days.

7. The method of claim 6, wherein the additional seismic noise is in the range of 0.1 Hz to 100 Hz.

8. The method of claim 1, wherein either of the arrays of seismological recorders is rearranged during a period of time between predicted gravitational tide resonances.

9. The method of claim 1, wherein the spectral analysis is performed at least every 6 hours.

10. The method of claim 1, further comprising:
positioning one or more means for recording hydrocarbon gas emission levels at one or more reference points along the Earth's surface,
registering hydrocarbon gas emission levels at each of said one or more reference points, and
normalizing said spectral analysis and said located anomalies based on said hydrocarbon gas emission levels.

11. The method of claim 1, further comprising:
positioning one or more means for recording a level of the Earth's electromagnetic field at one or more reference points along the Earth's surface,
registering an electromagnetic field level at each of said one or more reference points, and
normalizing said spectral analysis and said located anomalies based on said registered electromagnetic field level.

12. The method of claim 1, wherein during said spectral analysis, an anomaly is recorded if a ratio of an amplitude of a seismic noise spectrum on a resonant day versus an amplitude of the seismic noise spectrum on a non-resonant day is greater than or equal to 2.

13. The method of claim 1, wherein during said spectral analysis, a nature of the oil and gas deposit is determined based on a frequency of recorded oscillations.

14. The method of claim 1, further comprising performing aero-geochemical monitoring for hydrocarbon gases comprising methane or propane.

15. The method of claim 1, further comprising constructing a geological and geophysical model of locations of deposits based on the spectral analysis.

16. The method of claim 1, wherein either of the arrays of seismological recorders comprises uniformly positioned devices according to a desired density.

17. The method of claim 1, wherein the spectral analysis is further normalized based on changes in porosity of a geological formation, fracturing within the geological formation, and permeability of oil-gas-saturated objects within the geological formation.

18. The method of claim 1, wherein the spectral analysis further comprises analyzing data collected from spatial observation systems.

19. The method of claim 1, wherein said registering of low-frequency oscillations occurs during a day before a predicted resonance from gravitational tides, during the day of the predicted resonance, and for a day after the predicted resonance.

20. The method of claim 1, wherein said relationship comprises $R_i=3.5*L_0*sqrt(E_i/E_0)$.

* * * * *